(12) United States Patent
Nunes et al.

(10) Patent No.: US 10,679,064 B2
(45) Date of Patent: Jun. 9, 2020

(54) OPTIMIZED CLASSIFIER UPDATE

(71) Applicant: Microsoft Technology Licensing, LLC, Redmond, WA (US)

(72) Inventors: Leonardo de Oliveira Nunes, Rio de Janeiro (BR); Günter Nogueira Loch, Rio de Janeiro (BR)

(73) Assignee: Microsoft Technology Licensing, LLC, Redmond, WA (US)

( * ) Notice: Subject to any disclaimer, the term of this patent is extended or adjusted under 35 U.S.C. 154(b) by 191 days.

(21) Appl. No.: 15/718,671

(22) Filed: Sep. 28, 2017

(65) Prior Publication Data

US 2019/0095715 A1    Mar. 28, 2019

(51) Int. Cl.
*G06K 9/00* (2006.01)
*G06K 9/62* (2006.01)
*G06K 9/46* (2006.01)

(52) U.S. Cl.
CPC ..... *G06K 9/00718* (2013.01); *G06K 9/00624* (2013.01); *G06K 9/4628* (2013.01); *G06K 9/6215* (2013.01); *G06K 9/6269* (2013.01); *G06K 9/6274* (2013.01); *G06K 9/6284* (2013.01)

(58) Field of Classification Search
None
See application file for complete search history.

(56) References Cited

U.S. PATENT DOCUMENTS

| | | | |
|---|---|---|---|
| 9,020,246 B2* | 4/2015 | Li | G06K 9/6256 382/115 |
| 2010/0315235 A1* | 12/2010 | Adegoke | G01S 19/16 340/568.1 |
| 2011/0085734 A1* | 4/2011 | Berg | G06F 16/7834 382/195 |
| 2016/0007058 A1* | 1/2016 | Wang | H04N 21/23418 725/116 |
| 2017/0061229 A1* | 3/2017 | Rastgar | G06K 9/46 |

* cited by examiner

*Primary Examiner* — Hadi Akhavannik
(74) *Attorney, Agent, or Firm* — Schwegman Lundberg & Woessner, P.A.

(57) ABSTRACT

Disclosed in some examples are real-time video classifier systems, methods, devices, and machine readable mediums that determine whether or not to submit a current video frame to a classifier based upon a similarity score that measures a similarity between the current video frame and previous video frames found by the classifier to contain the feature of interest. For example, a similarity score may be calculated for a current video frame and a previous video frame found by the classifier to contain a feature of interest. The current video frame may be submitted to the classifier only if the similarity score is below a threshold similarity score. That is, only video frames that are sufficiently different from previous images that were found as containing the feature of interest are presented to the classifier.

21 Claims, 5 Drawing Sheets

OPTIMIZED CLASSIFIER UPDATE

BACKGROUND

Real time video understanding applications utilize a machine learning classifier that processes video frames to determine the presence and/or properties of objects in a video image. For example, a security system may feed video frames to the machine learning classifier to determine potential threats. Other applications include self-driving cars and augmented reality applications.

SUMMARY

Embodiments pertain to real-time video understanding solutions. Some embodiments relate to decreasing the computational resources needed to perform real-time video understanding. For example, disclosed is a video classification method including receiving a video frame, computing a similarity score quantifying a similarity between the video frame and an image previously determined by a classifier as containing a feature of interest, and determining, based upon the similarity score and a threshold, whether to submit the video frame to the classifier.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In a real-time video understanding pipeline, the classifiers that detect, estimate, or try to localize a given object or its properties in a video may be computationally expensive. System designers often grapple with competing factors such as processing power, power consumption, latency, and accuracy when designing these systems. For example, a system that submits every video frame to the classifier recognizes objects and motion faster, but either requires faster, more power hungry, and more expensive hardware or simpler classifiers that may sacrifice accuracy. Other solutions that submit less than every video frame to the classifier sacrifice latency in detecting features in the video to reduce the computational expense of the classifier.

Previous solutions have tried to reduce the latency by utilizing an algorithm to select the frames to submit to the classifier that attempts to predict when the classifier is going to be needed. These solutions distinguish the foreground of the video frame versus its background and decide, based upon the level of movement, whether a change that would justify running the classifier has occurred. The problem with such solutions is that they do not take into account what is important to the classifier when making this decision. This may cause unnecessary execution of the classifier. For example, if these systems detect something moving, they may submit the video image to the classifier, but that object may be of no interest to the classifier.

Disclosed in some examples are real-time video classifier systems, methods, devices, and machine readable mediums that determine whether or not to submit a current video frame to a classifier based upon a similarity score that measures a similarity between the current video frame and previous video frames found by the classifier to contain a feature of interest. The current video frame may be submitted to the classifier only if the similarity score is below a threshold similarity score. That is, only video frames that are sufficiently different from previous images that were found as containing the feature of interest are presented to the classifier.

Because of the nature of video, many frames will be very similar to other frames. For example, because a video may be 24 frames or more per second, and because the subjects of those frames may move very slowly over a particular second, each of those 24 frames may be very similar. This may be especially true for cameras that are fixed in a static location—such as security cameras found in surveillance applications. By utilizing a similarity comparison, the classifier may be skipped and the frame labeled with the feature for these similar frames, thus saving computational resources. By utilizing previous video frames containing the feature of interest to calculate the similarity score, it increases the likelihood of correctly identifying which frames need to be sent to the classifier and which frames do not. Running the classifier only when it is needed (as determined by the similarity scores) and not every frame, the present system frees up important computing resources.

This results in an ability to use less powerful computing resources (which may reduce costs, increase battery life, and the like) without sacrificing accuracy, or to use more powerful classifiers. Furthermore, because calculating the similarity score is not computationally intensive, the system may monitor the video frame for changes regularly—thereby decreasing latency.

Figure 1:
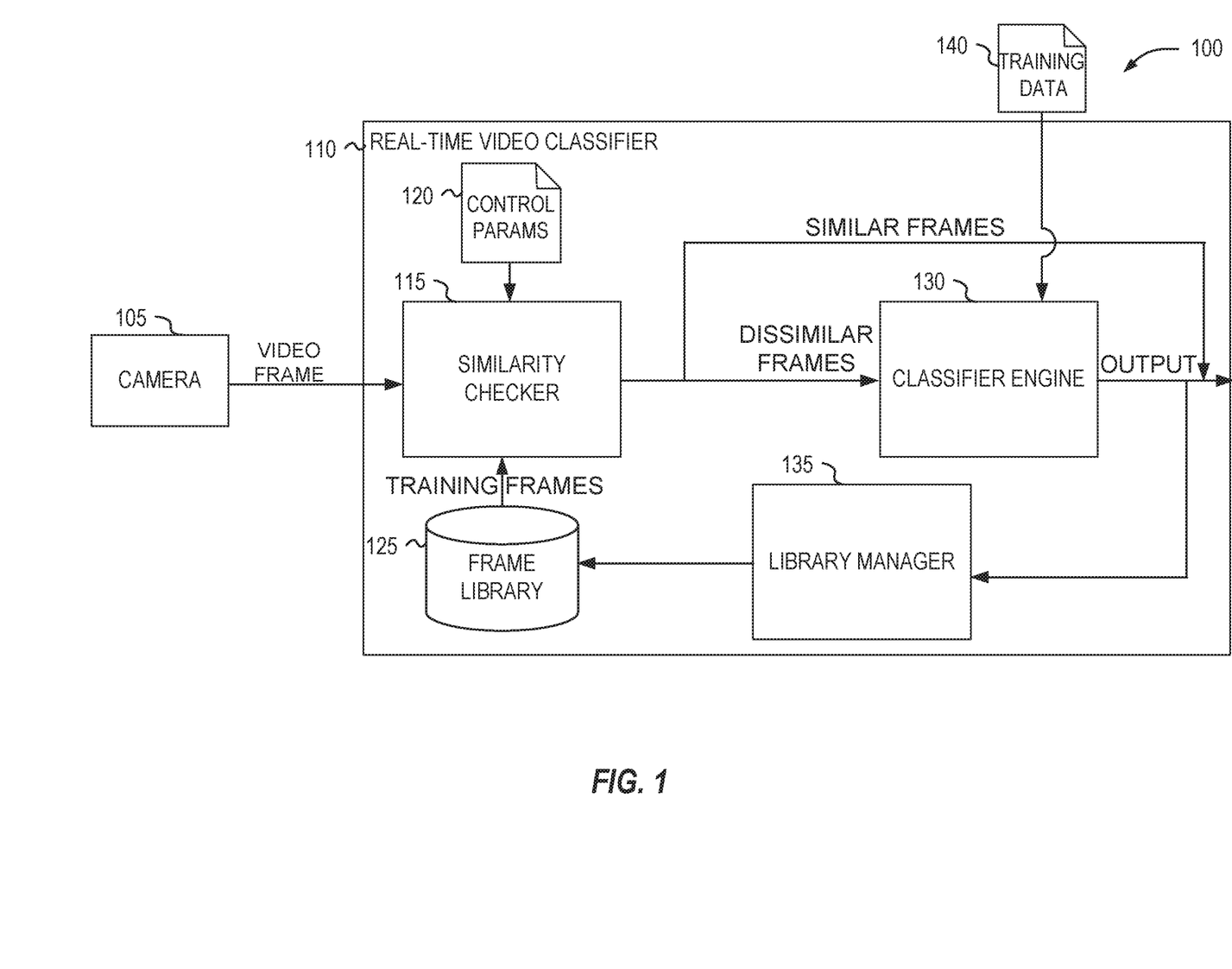
FIG. 1 shows a schematic flow diagram of a real-time video classifier according to some examples of the present disclosure.

FIG. 1 shows a schematic flow diagram 100 of a real-time video classifier 110 according to some examples of the present disclosure. Camera 105 sends one or more video frames to the real-time video classifier 110. The real-time video classifier 110 attempts to detect one or more features of interest in the video frame. Features of interest may be a desired characteristic of a real-world environment captured by the video frame and may include objects, people, faces (e.g., facial recognition), and the like. Features of interest may also include properties of objects, people, faces, and the like. Properties may include location in the video frame, size, velocity, and the like. For properties such as motion, multiple video frames may be utilized. The real-time video classifier may look for one or more features that the classifier engine 130 has been trained to find in a video frame. The features that the classifier engine 130 has been trained to find may be predetermined by a user or application of the real-time video classifier 110.

In many of the examples given herein a single video frame is utilized, but one of ordinary skill having the benefit of this disclosure will understand that the methods and systems described herein may be applied to a plurality of video frames as a group in addition to single video frames. Once features are detected, the existence of those features may be output to additional program logic that takes one or more actions based upon those features. For example, an augmented reality system may incorporate the detected feature into a projected graphical user interface. A security solution may sound an alarm or alert a user.

A similarity checker 115 computes one or more similarity scores that quantify how similar the received video frame is (in terms of pixel values) to each video frame in frame library 125. The video frames in the frame library 125 are previously received video frames that are identified by the classifier engine 130 as containing the feature of interest. In the examples of the present specification, the similarity score is a measure of similarity, and thus the greater the similarity score, the more similar the received video frame is to a frame in the frame library 125.

In other examples, a distance score may be utilized which may be a quantification of the dissimilarities between the video frame and a frame in the frame library 125. In these latter examples, the higher the distance score, the more dissimilar the images are. In some examples, when utilizing a distance score, a similarity score may be the inverse of the distance score. In other examples, when utilizing a distance score the comparison is adjusted from the similarity case where video frames that have a similarity score below a threshold are sent to the classifier to video frames with a distance score above a threshold are sent to the classifier. Example similarity score algorithms may include cross-correlation, kernelized correlation filters, and the like. In some examples, the similarity may be across the entire video frame or for one or more regions of the video frame. For example, the classifier may only operate on one or more regions. In these examples, the system may apply the similarity checking only on the region of interest.

The similarity checker 115 may utilize one or more control parameters 120 to determine whether, based upon the similarity score, to submit the received video frame to the classifier engine 130 for classification. In some examples, the control parameters 120 may be a threshold similarity score. If the similarity score is above the threshold, the similarity checker may skip the classifier engine 130 and output the classification (e.g., that the video frame includes the object). On the other hand, if the similarity score is below the threshold the video frame may be submitted to the classifier for a determination of whether the feature is found in the video frame. Note that in cases in which the similarity score is equal to the threshold, the video frame may be either submitted to the classifier engine 130 or the similarity checker may skip the classifier engine 130—depending on how the system is designed.

As previously described, the similarity checker 115 may compute a similarity score for each of the video frames in the frame library 125 and make the decision to skip the classifier engine 130 if any of the similarity scores are higher than the threshold. In other examples, the similarity checker 115 may compute a similarity score for each of the video frames in the frame library 125 and make the decision to skip the classifier engine 130 if more than a predetermined number, percentage, or ratio of the similarity scores are higher than the threshold. In still other examples, an average similarity score may be calculated from the similarity scores and if the average is above a predetermined threshold, then the classifier engine 130 may be skipped.

The classifier engine 130 may take a video frame as input and output one or more indications of whether one or more features are detected in the video frame. In some examples, the classifier engine 130 may be a supervised machine learning algorithm that may learn to detect features in a video frame based upon a set of labelled training data 140. For example, the classifier engine 130 may utilize one or more neural networks such as convolutional neural networks (CNNs). These neural networks may have one or more weights that are applied to the input pixels that are learned and refined using the training data set.

The output of the classifier engine 130 may be an indication of whether or not the feature is present in the image. If the feature is present, the video frame may be sent to the library manager 135 for inclusion in the frame library 125. Frame library 125 may store one or more previous frames indicated by the classifier engine 130 as indicating a feature of interest. Frame library 125 may store all previous video frames indicated as containing the feature of interest, may store a predetermined number of video frames in a last-in-first-out queue, may store all video frames that were received within a predetermined timeframe, or the like.

In addition to updating the frame library 125, output of the classifier that indicates a feature is found may also be utilized to update a threshold in the control parameters 120. For example, a sample of frames that are to bypass the classifier may actually be fed to the classifier to verify that the video frames contain the feature of interest. If the frames do not contain the feature of interest, the similarity threshold may be increased to ensure the accuracy of the system. Moreover, when the classifier output indicates a feature of interest, the similarity checker may decrease a threshold in an attempt to capture more frames at the similarity checker 115 rather than the classifier engine 130.

While the system in FIG. 1 was simplified to show a single classifier and a single feature, other systems may detect multiple features in the image. In some examples, a single classifier may detect multiple features. In these examples, the frame library 125 may include example video frames for each of the features detected by the classifier. The similarity checker 115 may then calculate the similarity scores for each feature using the respective video frames in the frame library 125 for each feature as previously explained. The similarity checker 115 may then send the video frame to the classifier engine 130 or bypass the classifier engine 130 on a feature-by-feature basis. That is, the video frame may be processed by the classifier engine 130 only for features that did not have similarity scores above the threshold. When comparing the similarity scores to a threshold, a single, global threshold may be utilized by the similarity checker 115. In other examples, a separate threshold may be utilized by the similarity checker 115 for each feature.

Figure 2:
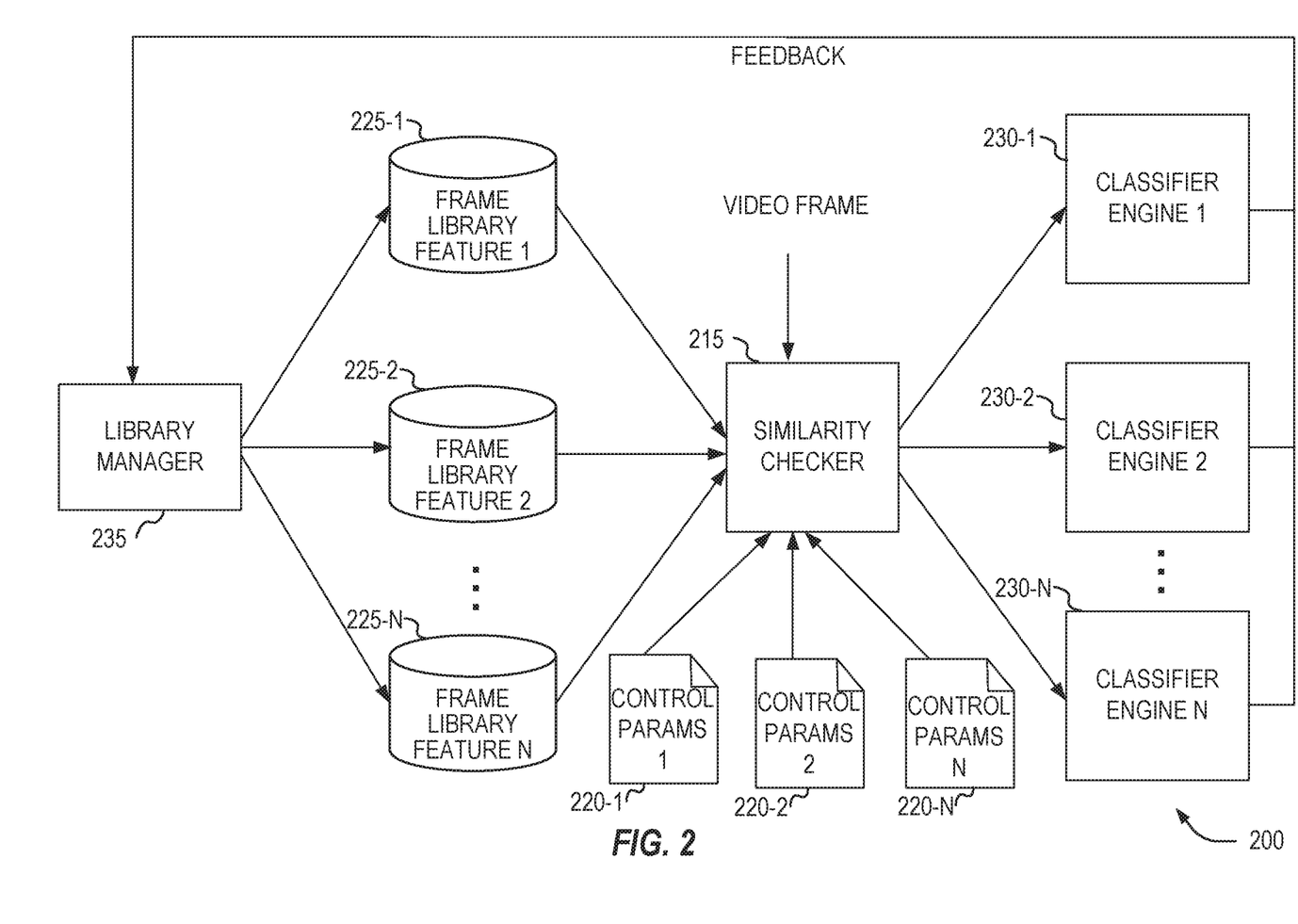
FIG. 2 shows a system utilizing multiple classifier engines (1 . . . N) for multiple features (1 . . . N) and multiple control parameters corresponding to each feature (1 . . . N) according to some examples of the present disclosure.

In other examples, multiple classifier engines 130 may be utilized. FIG. 2 shows a real-time video classification system 200 utilizing multiple classifier engines (1 . . . N) for multiple features (1 . . . N) and multiple control parameters corresponding to each feature (1 . . . N) according to some examples of the present disclosure. As shown a similarity checker 215 takes input from frame libraries 225-1, 225-2 through 225-N—each frame library corresponding to a feature 1 . . . N. For each feature, the similarity checker accesses a corresponding control parameter from one of the control parameters (e.g., control parameters 1 220-1, control parameters 2 220-2 through control parameters N 220-N).

Each one of control parameters may correspond to a particular feature. A similarity score may be calculated for each particular one of the N features based upon a comparison of the video frames in the frame library corresponding to the particular feature and the received video frame.

This score may then be compared with the threshold found in the control parameters (e.g., control params 1-N 220-1-220N) corresponding to the particular feature. For each particular feature where the similarity score is below the threshold for that feature the corresponding classifier (e.g., classifier engine 1 230-1, classifier engine 2 230-2, to classifier engine N 230-N) may be called. Feedback from each particular classifier may be utilized by the library manager 235 to update the particular frame library for that particular feature.

As an example, say the video classifier is looking for two features in video frames: an apple and a banana. The system may have two frame libraries:
Frame library 1 (apples): frames X and Y;
Frame library 2 (bananas): frames A and B;
For a new video frame Z, the system may calculate similarity scores: S1 that measures a similarity score between X and Z, S2 that measures a similarity score between X and Y, S3 that measures a similarity score between A and Z, and S4 that measures the similarity between Z and B. For the apples features, the video frame may be submitted to the classifier to look for apples if either S1 or S2 are below the similarity threshold (which may be a specific threshold for apples, or may be the same for both apples and bananas). Likewise, for the bananas feature, the video frame may be submitted to the classifier to look for bananas if either S3 or S4 are below the similarity threshold. As noted, in some examples, the apple and banana classifier may be the same classifier, or may be different classifiers. If the apple and banana classifier is the same classifier, in some examples, the similarity checker may indicate which of the features (apple, banana, or both) that the classifier is to check for.

Figure 3:
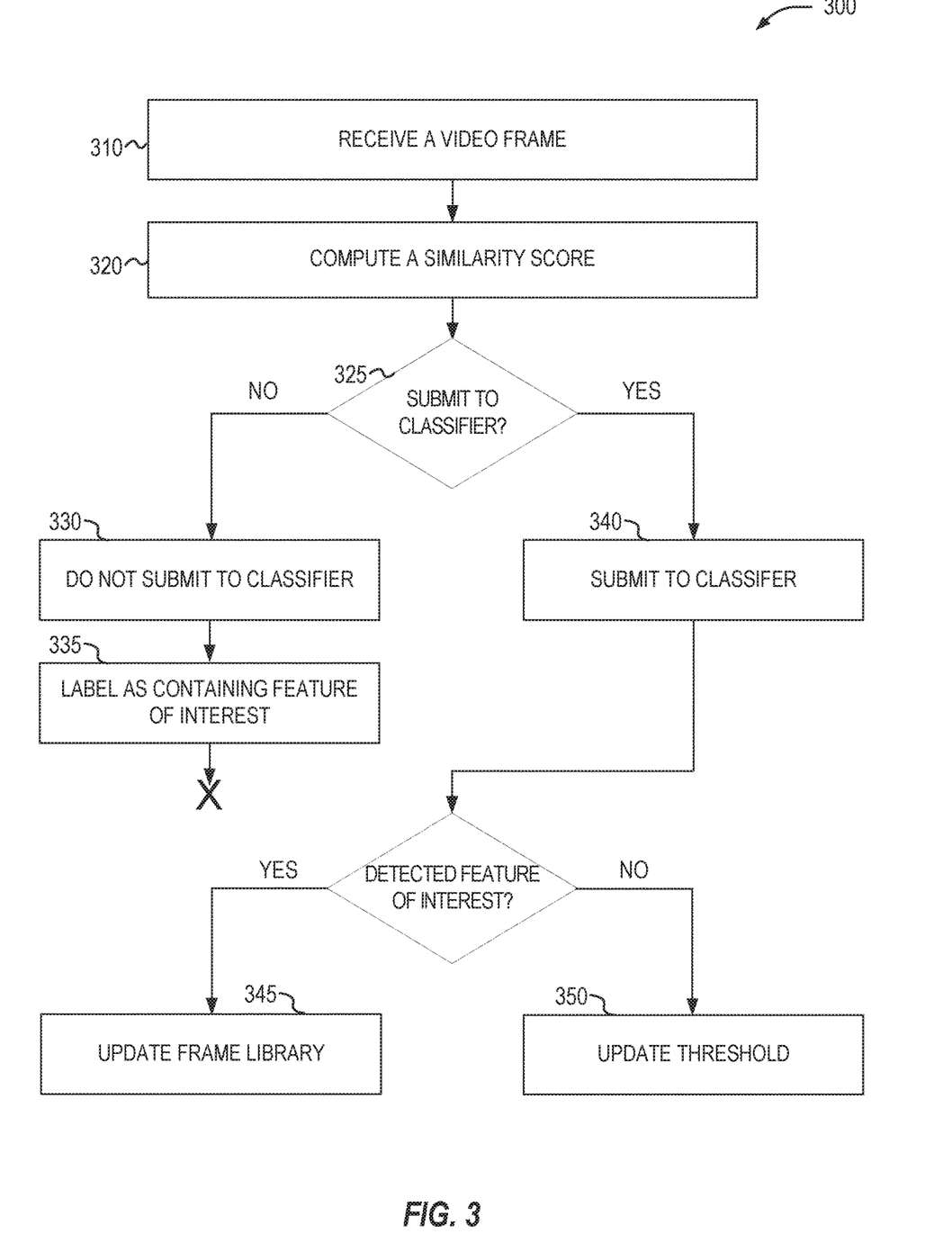
FIG. 3 shows a flowchart of a method of classifying a video in real-time according to some examples of the present disclosure.

FIG. 3 shows a flowchart of a method 300 of classifying a video in real-time according to some examples of the present disclosure. At operation 310 a video frame may be received. For example, from a video camera, at a sensor, over a network, over a system bus, over an external bus (e.g., a USB bus) or the like. At operation 320 the system may compute a similarity score quantifying a similarity between the video frame and an image in a frame library, the image in the library previously determined by a classifier as containing a feature of interest. At operation 325, the system may determine, based upon the similarity score and a threshold, whether to submit the video frame to the classifier. For example, if the similarity score is above a threshold then the system may decide not to submit the video frame to the classifier at operation 330, and at operation 335 may label the video frame as containing the feature of interest. If the video frame is chosen for submission to the classifier, then at operation 340 the video frame is actually submitted to the classifier. If the classifier detects a feature of interest, then at operation 345 the frame library may be updated to reflect the received video image. If no feature of interest was detected, then in some examples, the threshold may be updated at operation 350.

Figure 4A:
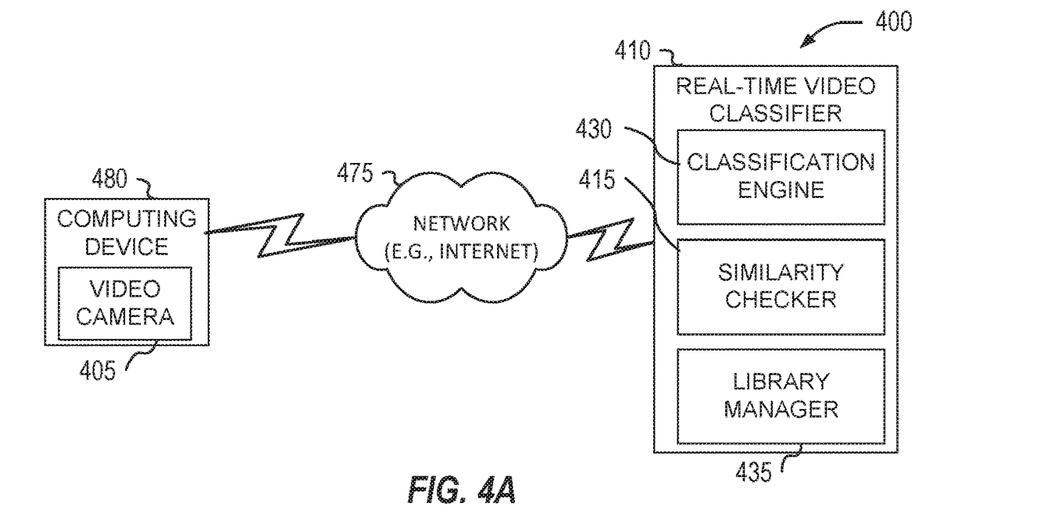
FIGS. 4A and 4B show two example configurations of the real-time video classifier according to some examples of the present disclosure.
Figure 4B:
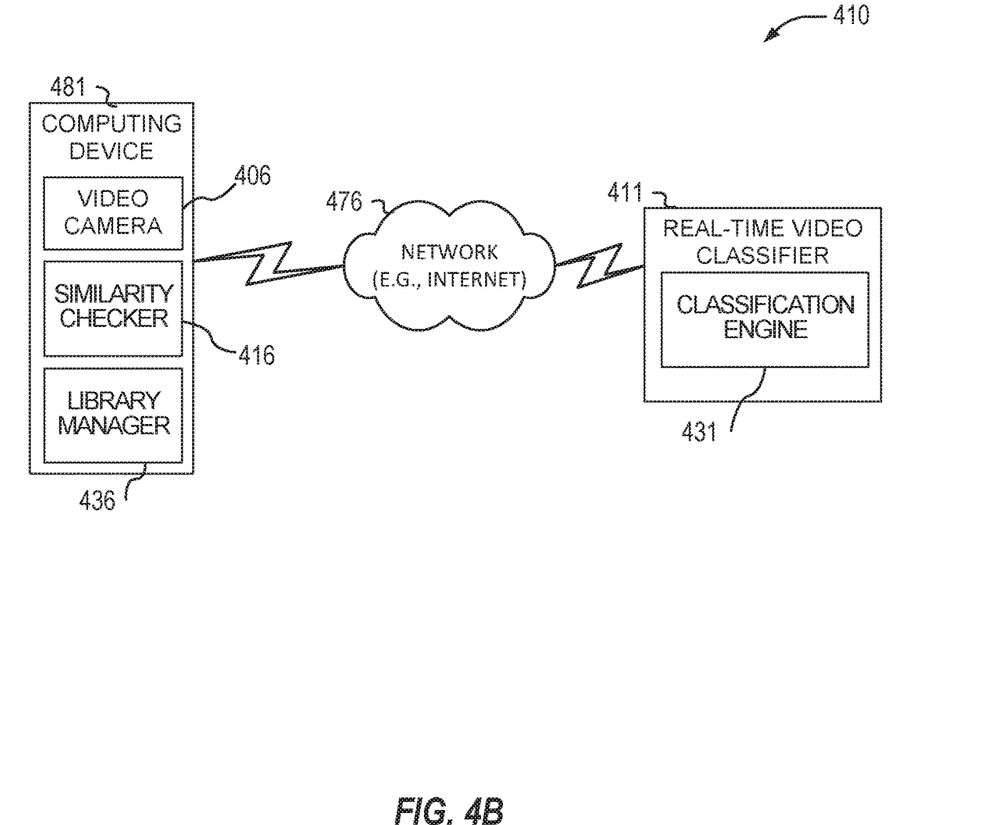

FIGS. 4A and 4B show two example configurations of the real-time video classifier according to some examples of the present disclosure. In configuration 400, the classifier is a network-based (i.e. cloud based) service where the classification engine 430, the similarity checker 415, library manager 435 (and corresponding libraries that are not shown for clarity) are all located on a network-based server (which may be described as an instance of a machine 500). Computing device 480 (which may be described as an instance of a machine 500) may have a video camera 405 that sends video frames over network 475 to the real-time video classifier 410. FIG. 4B shows an example in which some of the functionality (e.g., the similarity checker 416 and the library manager 436) are performed by the computing device 481. Computing device 481 may also include camera 406. Similarity checker 416 and library manager 436 may perform the similarity checking on video frames and only send video frames that are not similar to frames in the library over network 476 for classification by classification engine 431 of real-time video classifier 411. Other configurations may exist, such as all functionality being performed on the same computing device.

Figure 5:
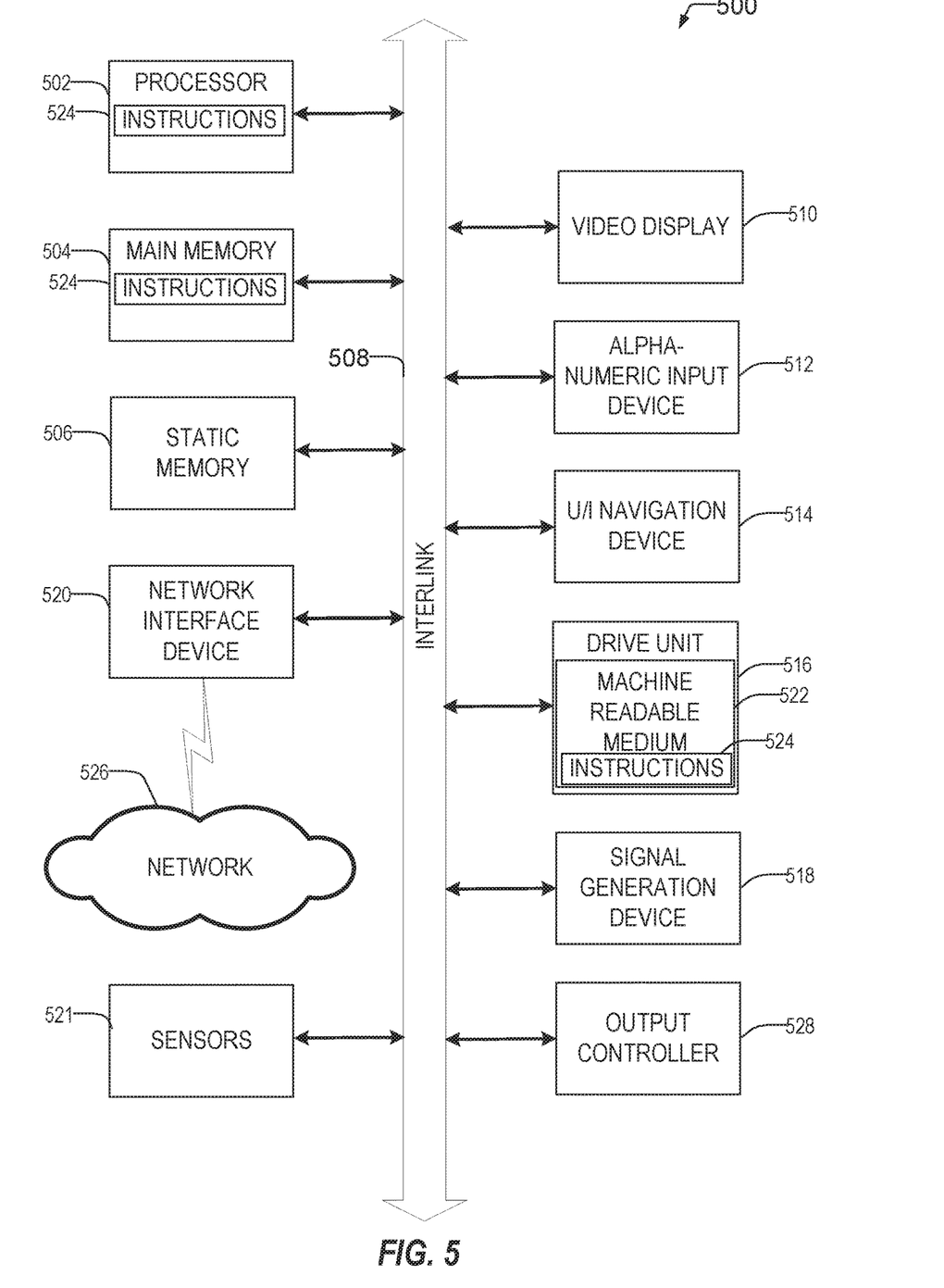
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Machine 500 may implement all or part of the real-time video classifier, such as real-time video classifier 110, 200, 410, 411. Machine 500 may implement all or part of the user devices, such as camera 105, computing device 480, 481, and the like. Furthermore, machine 500 may implement the method of FIG. 3. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520. The Machine 500 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques.

OTHER NOTES AND EXAMPLES

Example 1 is a real-time video classification method comprising: receiving a video frame; computing a similarity score quantifying a similarity between the video frame and a video frame previously determined by a machine-learned classifier as containing a feature of interest; and determining, based upon the similarity score and a threshold, whether to submit the received video frame to the classifier, the classifier determining a presence or absence of the feature of interest in the video frame.

In Example 2, the subject matter of Example 1 optionally includes wherein determining, based upon the similarity score and the threshold, whether to submit the received video frame to the classifier comprises determining that the received video frame is to be submitted to the classifier when the similarity score is less than a threshold similarity.

In Example 3, the subject matter of any one or more of Examples 1-2 optionally include wherein computing the similarity score comprises computing a cross-correlation between the received video frame and the video frame previously determined by the machine-learned classifier as containing the feature of interest.

In Example 4, the subject matter of any one or more of Examples 1-3 optionally include determining that the received video frame includes the feature of interest, and in response, notifying a user.

In Example 5, the subject matter of any one or more of Examples 1-4 optionally include wherein determining, based upon the similarity score and the threshold, whether to submit the video frame to the classifier comprises determining not to submit the video frame to the classifier if the similarity score is above the threshold.

In Example 6, the subject matter of any one or more of Examples 1-5 optionally include receiving a second video frame from the classifier determined by the classifier as containing the feature of interest; receiving a third video frame; computing a second similarity score quantifying a similarity between the second received video frame and the video frame previously determined by a classifier as containing a feature of interest; computing a third similarity score quantifying a similarity between the second received video frame and the second video frame from the classifier determined by the classifier as containing the feature of interest; and determining, based upon the second and third similarity scores and the threshold, whether to submit the second received video frame to the classifier.

In Example 7, the subject matter of Example 6 optionally includes wherein determining, based upon the second and third similarity scores and the threshold, whether to submit the video frame to the classifier comprises submitting the second video frame to the classifier if the second and third similarities scores are both below the threshold.

Example 8 is a machine-readable medium, comprising instructions, that when executed by the machine, cause the machine to perform operations comprising: receiving a video frame; computing a similarity score quantifying a similarity between the video frame and a video frame previously determined by a machine-learned classifier as containing a feature of interest; and determining, based upon the similarity score and a threshold, whether to submit the received video frame to the classifier, the classifier determining a presence or absence of the feature of interest in the video frame.

In Example 9, the subject matter of Example 8 optionally includes wherein the operations of determining, based upon the similarity score and the threshold, whether to submit the received video frame to the classifier comprises operations of determining that the received video frame is to be submitted to the classifier when the similarity score is less than a threshold similarity.

In Example 10, the subject matter of any one or more of Examples 8-9 optionally include wherein the operations of computing the similarity score comprises computing a cross-correlation between the received video frame and the video frame previously determined by the machine-learned classifier as containing the feature of interest.

In Example 11, the subject matter of any one or more of Examples 8-10 optionally include wherein the operations further comprise: determining that the received video frame includes the feature of interest, and in response, notifying a user.

In Example 12, the subject matter of any one or more of Examples 8-11 optionally include wherein the operations of determining, based upon the similarity score and the threshold, whether to submit the video frame to the classifier comprises not submitting the video frame to the classifier if the similarity score is above the threshold.

In Example 13, the subject matter of any one or more of Examples 8-12 optionally include wherein the operations further comprise: receiving a second video frame from the classifier determined by the classifier as containing the feature of interest; receiving a third video frame; computing a second similarity score quantifying a similarity between the second received video frame and the video frame previously determined by a classifier as containing a feature of interest; computing a third similarity score quantifying a similarity between the second received video frame and the second video frame from the classifier determined by the classifier as containing the feature of interest; and determining, based upon the second and third similarity scores and the threshold, whether to submit the second received video frame to the classifier.

In Example 14, the subject matter of Example 13 optionally includes wherein the operations of determining, based upon the second and third similarity scores and the threshold, whether to submit the video frame to the classifier comprises submitting the second video frame to the classifier if the second and third similarities scores are both below the threshold.

Example 15 is a system comprising: a processor; a memory, communicatively coupled to the processor and comprising instructions, that when executed by the processor cause the processor to perform operations comprising: receiving a video frame; computing a similarity score quantifying a similarity between the video frame and a video frame previously determined by a machine-learned classifier as containing a feature of interest; and determining, based upon the similarity score and a threshold, whether to submit the received video frame to the classifier, the classifier determining a presence or absence of the feature of interest in the video frame.

In Example 16, the subject matter of Example 15 optionally includes wherein the operations of determining, based upon the similarity score and the threshold, whether to submit the received video frame to the classifier comprises operations of determining that the received video frame is to be submitted to the classifier when the similarity score is less than a threshold similarity.

In Example 17, the subject matter of any one or more of Examples 15-16 optionally include wherein the operations of computing the similarity score comprises computing a cross-correlation between the received video frame and the video frame previously determined by the machine-learned classifier as containing the feature of interest.

In Example 18, the subject matter of any one or more of Examples 15-17 optionally include wherein the operations further comprise: determining that the received video frame includes the feature of interest, and in response, notifying a user.

In Example 19, the subject matter of any one or more of Examples 15-18 optionally include wherein the operations of determining, based upon the similarity score and the threshold, whether to submit the video frame to the classifier comprises not submitting the video frame to the classifier if the similarity score is above the threshold.

In Example 20, the subject matter of any one or more of Examples 15-19 optionally include wherein the operations further comprise: receiving a second video frame from the classifier determined by the classifier as containing the feature of interest; receiving a third video frame; computing a second similarity score quantifying a similarity between the second received video frame and the video frame previously determined by a classifier as containing a feature of interest; computing a third similarity score quantifying a similarity between the second received video frame and the second video frame from the classifier determined by the classifier as containing the feature of interest; and determining, based upon the second and third similarity scores and the threshold, whether to submit the second received video frame to the classifier.

In Example 21, the subject matter of Example 20 optionally includes wherein the operations of determining, based upon the second and third similarity scores and the threshold, whether to submit the video frame to the classifier comprises submitting the second video frame to the classifier if the second and third similarities scores are both below the threshold.

Example 22 is a real-time video classification device comprising: means for receiving a video frame; means for computing a similarity score quantifying a similarity between the video frame and a video frame previously determined by a machine-learned classifier as containing a feature of interest; and means for determining, based upon the similarity score and a threshold, whether to submit the received video frame to the classifier, the classifier determining a presence or absence of the feature of interest in the video frame.

In Example 23, the subject matter of Example 22 optionally includes wherein the means for determining, based upon the similarity score and the threshold, whether to submit the received video frame to the classifier comprises means for determining that the received video frame is to be submitted to the classifier when the similarity score is less than a threshold similarity.

In Example 24, the subject matter of any one or more of Examples 22-23 optionally include wherein the means for computing the similarity score comprises means for computing a cross-correlation between the received video frame and the video frame previously determined by the machine-learned classifier as containing the feature of interest.

In Example 25, the subject matter of any one or more of Examples 22-24 optionally include means for determining that the received video frame includes the feature of interest, and in response, notifying a user.

In Example 26, the subject matter of any one or more of Examples 22-25 optionally include wherein the means for determining, based upon the similarity score and the threshold, whether to submit the video frame to the classifier comprises means for determining not to submit the video frame to the classifier if the similarity score is above the threshold.

In Example 27, the subject matter of any one or more of Examples 22-26 optionally include means for receiving a second video frame from the classifier determined by the classifier as containing the feature of interest; means for receiving a third video frame; means for computing a second similarity score quantifying a similarity between the second received video frame and the video frame previously determined by a classifier as containing a feature of interest; means for computing a third similarity score quantifying a similarity between the second received video frame and the second video frame from the classifier determined by the classifier as containing the feature of interest; and means for determining, based upon the second and third similarity scores and the threshold, whether to submit the second received video frame to the classifier.

In Example 28, the subject matter of Example 27 optionally includes wherein the means for determining, based upon the second and third similarity scores and the threshold, whether to submit the video frame to the classifier comprises means for submitting the second video frame to the classifier if the second and third similarities scores are both below the threshold.

What is claimed is:

1. A real-time video classification method comprising:
   receiving a first video frame;
   computing similarity scores, each similarity score quantifying a similarity between an entirety of the first video frame and a plurality of second video frames, each of the second video frames previously determined to contain a same feature of interest by a machine-learned classifier;
   determining, based upon the similarity scores and a threshold, whether to submit the received first video frame to the machine-learned classifier, the machine-learned classifier determining a presence or absence of the same feature of interest in the first video frame; and
   responsive to a determination that the received first video frame is not to be submitted to the machine-learned classifier, labelling the first video frame as containing the feature of interest.

2. The method of claim 1, wherein determining, based upon the similarity scores and the threshold, whether to submit the first video frame to the classifier comprises determining that the first video frame is not to be submitted to the classifier when one of the similarity scores is greater than a threshold similarity.

3. The method of claim 1, wherein computing the similarity scores comprises computing a cross-correlation between the first video frame and each of the second video frames.

4. The method of claim 1, comprising:
   determining that the first video frame includes the feature of interest, and in response, notifying a user.

5. The method of claim 1, wherein determining, based upon the similarity scores and the threshold, whether to submit the first video frame to the classifier comprises determining not to submit the first video frame to the classifier if an average of the similarity scores is above the threshold.

6. A machine-readable storage medium, comprising instructions, that when executed by a machine, cause the machine to perform operations comprising:
   receiving a first video frame;
   computing similarity scores, each similarity score quantifying a similarity between an entirety of the first video frame and a plurality of second video frames, each of the second video frames previously determined to contain a same feature of interest by a machine-learned classifier; and
   determining, based upon the similarity score and a threshold, whether to submit the received first video frame to the machine-learned classifier, the machine-learned classifier determining a presence or absence of the same feature of interest in the first video frame; and
   responsive to a determination that the received first video frame is not to be submitted to the machine-learned classifier, labelling the first video frame as containing the feature of interest.

7. The machine-readable storage medium of claim 6, wherein the operations of determining, based upon the similarity scores and the threshold, whether to submit the first video frame to the classifier comprises operations of determining that the first video frame is not to be submitted to the classifier when one of the similarity scores is greater than a threshold similarity.

8. The machine-readable storage medium of claim 6, wherein the operations of computing the similarity scores comprises computing a cross-correlation between the first video frame and each of the second video frames.

9. The machine-readable storage medium of claim 6, wherein the operations further comprise:
   determining that the first video frame includes the feature of interest, and in response, notifying a user.

10. The machine-readable storage medium of claim 6, wherein the operations of determining, based upon the similarity scores and the threshold, whether to submit the first video frame to the classifier comprises not submitting the first video frame to the classifier if an average of the similarity scores is above the threshold.

11. A system comprising:
a processor;
a memory, communicatively coupled to the processor and comprising instructions, that when executed by the processor cause the processor to perform operations comprising:
receiving a first video frame;
computing similarity scores, each similarity score quantifying a similarity between an entirety of the first video frame and a plurality of second video frames, each of the second video frames previously determined to contain a same feature of interest by a machine-learned classifier; and
determining, based upon the similarity score and a threshold, whether to submit the received first video frame to the machine-learned classifier, the machine-learned classifier determining a presence or absence of the same feature of interest in the first video frame; and
responsive to a determination that the received first video frame is not to be submitted to the machine-learned classifier, labelling the first video frame as containing the feature of interest.

12. The system of claim 11, wherein the operations of determining, based upon the similarity scores and the threshold, whether to submit the first video frame to the classifier comprises operations of determining that the first video frame is not to be submitted to the classifier when any of the similarity scores are greater than a threshold similarity.

13. The system of claim 11, wherein the operations of computing the similarity scores comprises computing a cross-correlation between the first video frame and the second video frames.

14. The system of claim 11, wherein the operations further comprise:
determining that the first video frame includes the feature of interest, and in response, notifying a user.

15. The system of claim 11, wherein the operations of determining, based upon the similarity scores and the threshold, whether to submit the first video frame to the classifier comprises not submitting the first video frame to the classifier if an average of the similarity scores is above the threshold.

16. The method of claim 1, further comprising:
receiving a third video frame;
computing second similarity scores quantifying a second similarity between an entirety of the third video frame and the plurality of second video frames; and
determining, based upon the similarity scores and the threshold, that the third video frame is to be submitted to the machine-learned classifier.

17. The method of claim 16, further comprising:
determining, by the machine-learned classifier, that the third video frame includes the feature of interest; and
responsive to determining that the third video frame includes the feature of interest, adding the third video frame to the plurality of second video frames.

18. The machine-readable medium of claim 6, further comprising:
receiving a third video frame;
computing second similarity scores quantifying a second similarity between an entirety of the third video frame and the plurality of second video frames; and
determining, based upon the similarity scores and the threshold, that the third video frame is to be submitted to the machine-learned classifier.

19. The machine-readable medium of claim 18, wherein the operations further comprise:
determining, by the machine-learned classifier, that the third video frame includes the feature of interest; and
responsive to determining that the third video frame includes the feature of interest, adding the third video frame to the plurality of second video frames.

20. The system of claim 11, wherein the operations further comprise:
receiving a third video frame;
computing second similarity scores quantifying a second similarity between an entirety of the third video frame and the plurality of second video frames; and
determining, based upon the similarity scores and the threshold, that the third video frame is to be submitted to the machine-learned classifier.

21. The system of claim 20, wherein the operations further comprise:
determining, by the machine-learned classifier, that the third video frame includes the feature of interest; and
responsive to determining that the third video frame includes the feature of interest, adding the third video frame to the plurality of second video frames.

* * * * *